United States Patent
Hasan et al.

(10) Patent No.: US 10,755,228 B1
(45) Date of Patent: Aug. 25, 2020

(54) IMAGE PROCESSING SYSTEM FOR DEEP FASHION COLOR RECOGNITION

(71) Applicant: JDA Software Group, Inc., Scottsdale, AZ (US)

(72) Inventors: Md Kamrul Hasan, Montreal (CA); Marie-Claude Côté, Montreal (CA)

(73) Assignee: Blue Yonder Group, Inc., Scottsdale, AZ (US)

( * ) Notice: Subject to any disclaimer, the term of this patent is extended or adjusted under 35 U.S.C. 154(b) by 175 days.

(21) Appl. No.: 15/939,035

(22) Filed: Mar. 28, 2018

Related U.S. Application Data

(60) Provisional application No. 62/478,211, filed on Mar. 29, 2017.

(51) Int. Cl.
   *G06Q 10/08*    (2012.01)
   *G06T 7/90*     (2017.01)

(52) U.S. Cl.
   CPC ............ *G06Q 10/087* (2013.01); *G06T 7/90* (2017.01); *G06T 2207/10024* (2013.01); *G06T 2207/20081* (2013.01)

(58) Field of Classification Search
   None
   See application file for complete search history.

(56) References Cited

U.S. PATENT DOCUMENTS

| 10,360,482 B1 * | 7/2019 | Khare | G06K 9/66 |
| 10,387,740 B2 * | 8/2019 | Yang | G06K 9/4642 |
| 2014/0279764 A1 * | 9/2014 | Lahr | G06F 9/5038 706/12 |
| 2016/0275374 A1 * | 9/2016 | Zhu | G06K 9/6267 |
| 2016/0350336 A1 * | 12/2016 | Checka | G06K 9/6215 |
| 2016/0358337 A1 * | 12/2016 | Dai | G06T 5/10 |
| 2017/0300786 A1 * | 10/2017 | Gope | G06K 9/00791 |
| 2017/0308800 A1 * | 10/2017 | Cichon | G06N 20/00 |
| 2018/0243800 A1 * | 8/2018 | Kumar | B07C 5/3416 |

FOREIGN PATENT DOCUMENTS

| CN | 105761127 A | * | 7/2016 |
| CN | 106504064 A | * | 3/2017 |

OTHER PUBLICATIONS

Adly, Hussein Mohamed, and Mohamed Moustafa. "A hybrid deep learning approach for texture analysis." 2017 2nd International Conference on Multimedia and Image Processing (ICMIP). IEEE, 2017. (Year: 2017).*

Z. Li, Y. Fan and F. Wang, "Convolutional autoencoder-based color image classification using chroma subsampling in YCbCr space," 2015 8th International Congress on Image and Signal Processing (CISP), Shenyang, 2015, pp. 351-355. (Year: 2015).*

(Continued)

*Primary Examiner* — Andrae S Allison
(74) *Attorney, Agent, or Firm* — Spencer Fane LLP; Steven J. Laureanti

(57) ABSTRACT

A system and method are disclosed for image processing of one or more items in an inventory of one or more supply chain entities. Embodiments include receiving an initial set of images of at least two items in the inventory, identifying color distributions from the initial set of images using two encoders, and grouping colors of the at least two items based on similarities of the identified color distributions using a color coding model.

14 Claims, 8 Drawing Sheets

(56) References Cited

OTHER PUBLICATIONS

Strub, Florian, Romaric Gaudel, and Jérémie Mary. "Hybrid recommender system based on autoencoders." Proceedings of the 1st Workshop on Deep Learning for Recommender Systems. ACM, 2016. (Year: 2016).*

Shi, Hailin, et al. "Learning discriminative features with class encoder." Proceedings of the IEEE Conference on Computer Vision and Pattern Recognition Workshops. 2016. (Year: 2016).*

* cited by examiner

| FIG. 5A |
| FIG. 5B |

IMAGE PROCESSING SYSTEM FOR DEEP FASHION COLOR RECOGNITION

CROSS-REFERENCE TO RELATED APPLICATIONS

The present disclosure is related to that disclosed in the U.S. Provisional Application No. 62/478,211, filed Mar. 29, 2017, entitled "Image Processing System for Fashion Color Recognition" U.S. Provisional Application No. 62/478,211 is assigned to the assignee of the present application. The subject matter disclosed in U.S. Provisional Application No. 62/478,211 is hereby incorporated by reference into the present disclosure as if fully set forth herein. The present invention hereby claims priority under 35 U.S.C. § 119(e) to U.S. Provisional Application No. 62/478,211.

TECHNICAL FIELD

The present disclosure relates generally to image processing and specifically to a system and method of normalizing color information for products in a supply chain.

BACKGROUND

Managing and planning operations for products in a fashion retail supply chain often requires analyzing color attributes of products prior to making actionable decisions. Color attributes may be expressed in terms of color codes, but color codes differ between manufacturers, product lines, and even the same products from season to season, which is problematic for attribute-driven operations such as planning, demand forecasting, and customer segmentation. This lack of uniform color-coding among products in a fashion retail supply chain is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
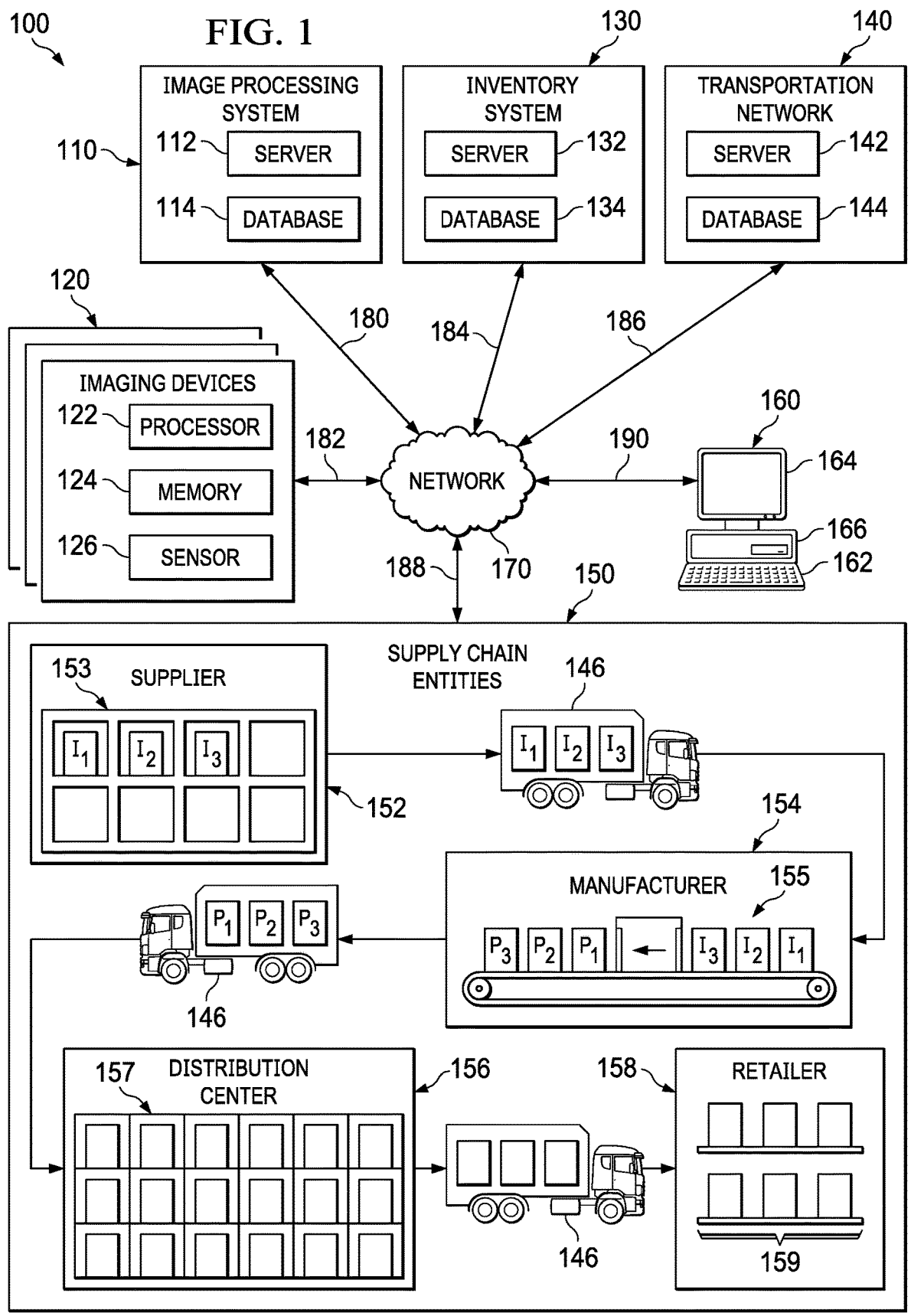
FIG. 1 illustrates an exemplary supply chain network according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to a system that analyzes product images using computer vision and machine learning techniques to generate uniform color codes. Color is an important attribute of products in many industries, and nowhere more so than in fashion retail products. Fashion retailers frequently create products of new or uncommon colors or change colors of existing products, and, each fashion retailer often uses its own color definitions. Even with digital imaging of products, color coding of images varies greatly between different supply chain entities and even within different departments or between products of the same supply chain entity.

Without uniform color-coding, many decisions are currently made by human experts who must judge and evaluate subjective color distinctions (such as, for example, determining whether a blue is a light-blue or a dark-blue or identifying the primary-color of a multi-color dress). Such distinctions are, sometimes, vague, at least in the quantitative sense, and differ from expert to expert.

Embodiments of the following disclosure also relate to generating a color-coding model that, after training with product images to identify color groups, identifies product colors for new product images. According to a further aspect, some embodiments may numerically measure the similarity or dissimilarity between colors, identify possible new colors, and improve operations and services that require standard and uniform color definitions.

FIG. 1 illustrates exemplary supply chain network 100 according to an embodiment. Supply chain network 100 comprises image processing system 110, one or more imaging devices 120, inventory system 130, transportation network 140, one or more supply chain entities 150, computer 160, network 170, and communication links 180-190. Although a single image processing system 110, one or more imaging devices 120, a single inventory system 130, a single transportation network 140, one or more supply chain entities 150, a single computer 160, and a single network 170, are shown and described, embodiments contemplate any number of image processing systems, imaging devices, inventory systems, transportation systems, supply chain entities, computers, or networks, according to particular needs.

In one embodiment, image processing system 110 comprises server 112 and database 114. According to embodiments, server 112 comprises an image processing module that processes images, analyzes the images based on a color-coding model, generates color labels for imaged products, and assigns products to color groups. According to embodiments, server 112 may also comprise one or more modules that receive, store, and transmit data about one or more products or items (including images of products, color codes, pricing data, attributes, and attribute values) and one or more modules that define color models based, at least in part, on a neural network model, such as a Restricted Boltzmann Machine (RBM) or auto-encoder model and group product images by identified colors, as described in more detail below. According to some embodiments, the functions and methods described in connection with the image processing module or image processing system 110 may be performed directly by one or more image processors or by one or more modules configured to perform the functions and methods as described.

One or more imaging devices 120 comprise one or more processors 122, memory 124, one or more sensors 126, and may include any suitable input device, output device, fixed or removable computer-readable storage media, or the like. According to embodiments, one or more imaging devices 120 comprise an electronic device that receives imaging data from one or more sensors 126 or from one or more databases in supply chain network 100. One or more sensors 126 of one or more imaging devices 120 may comprise an imaging sensor, such as, a camera, scanner, electronic eye, photodiode, charged coupled device (CCD), or any other electronic component that detects visual characteristics (such as color, shape, size, or the like) of objects. One or more imaging devices 120 may comprise, for example, a mobile handheld electronic device such as, for example, a smartphone, a tablet computer, a wireless communication device, and/or one or more networked electronic devices configured to image items using sensor 126 and transmit product images to one or more databases.

In addition, or as an alternative, one or more sensors 126 may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like objects that encode identifying information. One or more imaging devices 120 may generate a mapping of one or more items in the supply chain network 100 by scanning an identifier or object associated with an item and identifying the item based, at least in part, on the scan. This may include, for example, a stationary scanner located at one or more supply chain entities 150 that scans items as the items pass near the scanner. As explained in more detail below, image processing system 110, one or more imaging devices 120, inventory system 130, and transportation network 140 may use the mapping of an item to locate the item in supply chain network 100.

Additionally, one or more sensors 126 of one or more imaging devices 120 may be located at one or more locations local to, or remote from, the one or more imaging devices 120, including, for example, one or more sensors 126 integrated into one or more imaging devices 120 or one or more sensors 126 remotely located from, but communicatively coupled with, one or more imaging devices 120. According to some embodiments, one or more sensors 126 may be configured to communicate directly or indirectly with one or more of image processing system 110, one or more imaging devices 120, inventory system 130, transportation network 140, one or more supply chain entities 150, computer 160, and/or network 170 using one or more communication links 180-190.

Inventory system 130 comprises server 132 and database 134. Server 132 of inventory system 130 is configured to receive and transmit item data, including item identifiers, pricing data, attribute data, inventory levels, and other like data about one or more items at one or more locations in the supply chain network 100. Server 132 stores and retrieves item data from database 144 or from one or more locations in supply chain network 100.

Transportation network 140 comprises server 142 and database 144. According to embodiments, transportation network 140 directs one or more transportation vehicles 146 to ship one or more items between one or more supply chain entities 150, based, at least in part, on color-attribute-based customer segmentation, trend identification, supply chain demand forecasts, and/or product assortments determined by image processing system 110, the number of items currently in stock at one or more supply chain entities 150, the number of items currently in transit in the transportation network 140, forecasted demand, a supply chain disruption, and/or one or more other factors described herein. Transportation vehicles 146 comprise, for example, any number of trucks, cars, vans, boats, airplanes, unmanned aerial vehicles (UAVs), cranes, robotic machinery, or the like. Transportation vehicles 146 may comprise radio, satellite, or other communication that communicates location information (such as, for example, geographic coordinates, distance from a location, global positioning satellite (GPS) information, or the like) with image processing system 110, one or more imaging devices 120, inventory system 130, transportation network 140, and/or one or more supply chain entities 150 to identify the location of the transportation vehicle 146 and the location of any inventory or shipment located on the transportation vehicle 146.

As shown in FIG. 1, supply chain network 100 operates on one or more computers 160 that are integral to or separate from the hardware and/or software that support image processing system 110, one or more imaging devices 120, inventory system 130, transportation network 140, and one or more supply chain entities 150. Supply chain network 100 comprising image processing system 110, one or more imaging devices 120, inventory system 130, transportation network 140, and one or more supply chain entities 150 may operate on one or more computers 160 that are integral to or separate from the hardware and/or software that support image processing system 110, one or more imaging devices 120, inventory system 130, transportation network 140, and one or more supply chain entities 150. Computers 160 may include any suitable input device 162, such as a keypad, mouse, touch screen, microphone, or other device to input information. Output device 164 may convey information associated with the operation of supply chain network 100, including digital or analog data, visual information, or audio information. Computer 160 may include fixed or removable computer-readable storage media, including a non-transitory computer readable medium, magnetic computer disks, flash drives, CD-ROM, in-memory device or other suitable media to receive output from and provide input to supply chain network 100.

Computer 160 may include one or more processors 166 and associated memory to execute instructions and manipulate information according to the operation of supply chain network 100 and any of the methods described herein. In addition, or as an alternative, embodiments contemplate executing the instructions on computer 160 that cause computer 160 to perform functions of the method. Further examples may also include articles of manufacture including tangible non-transitory computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from image processing system 110, one or more imaging devices 120, inventory system 130, transportation network 140, and one or more supply chain entities 150. In addition, each of the one or more computers 160 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with the inventory planer 110, one or more imaging devices 120, inventory system 130, transportation network 140, and one or more supply chain entities 150. These one or more users may include, for example, a "manager" or a "planner" handling assortment planning, customer segmentation, and/or one or more related tasks within the system. In addition, or as an alternative, these one or more users within the system may include, for example, one or more computers programmed to autonomously handle, among other things, one or more supply chain processes such as assortment planning, customer segmentation, demand planning, supply and distribution planning, inventory management, allocation planning, order fulfillment, adjustment of manufacturing and inventory levels at various stocking points, and/or one or more related tasks within supply chain network 100.

One or more supply chain entities 150 represent one or more supply chain networks, including one or more enterprises, such as, for example networks of one or more suppliers 152, manufacturers 154, distribution centers 156, retailers 158 (including brick and mortar and online stores), customers, and/or the like. Suppliers 152 may be any suitable entity that offers to sell or otherwise provides one or more items (i.e., materials, components, or products) to one or more manufacturers 154. Suppliers 152 may comprise automated distribution systems 153 that automatically transport products to one or more manufacturers 154 based, at least in part, color-attribute-based customer segmentation, trend identification, supply chain demand forecasts, and/or product assortments determined by image processing system 110, and/or one or more other factors described herein.

Manufacturers 154 may be any suitable entity that manufactures at least one product. Manufacturers 154 may use one or more items during the manufacturing process to produce any manufactured, fabricated, assembled, or otherwise processed item, material, component, good, or product. In one embodiment, a product represents an item ready to be supplied to, for example, one or more supply chain entities 150 in supply chain network 100, such as retailers 158, an item that needs further processing, or any other item. Manufacturers 154 may, for example, produce and sell a product to suppliers 152, other manufacturers 154, distribution centers 156, retailers 158, a customer, or any other suitable person or entity. Manufacturers 154 may comprise automated robotic production machinery 155 that produce products based, at least in part, color-attribute-based customer segmentation, trend identification, supply chain demand forecasts, and/or product assortments determined by image processing system 110, and/or one or more other factors described herein.

Distribution centers 156 may be any suitable entity that offers to store or otherwise distribute at least one product to one or more retailers 158 and/or customers. Distribution centers 156 may, for example, receive a product from a first one or more supply chain entities 150 in supply chain network 100 and store and transport the product for a second one or more supply chain entities 150. Distribution centers 156 may comprise automated warehousing systems 157 that automatically remove products from and place products into inventory based, at least in part, color-attribute-based customer segmentation, trend identification, supply chain demand forecasts, and/or product assortments determined by image processing system 110, and/or one or more other factors described herein.

Retailers 158 may be any suitable entity that obtains one or more products to sell to one or more customers. Retailers 158 may comprise any online or brick-and-mortar store, including stores with shelving systems 159. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of retailers 158 based on computer-generated instructions or automatically by machinery to place products in a desired location in retailers 158 and which may be based, at least in part, color-attribute-based customer segmentation, trend identification, supply chain demand forecasts, and/or product assortments determined by image processing system 110, and/or one or more other factors described herein.

Although one or more supply chain entities 150 are shown and described as separate and distinct entities, the same entity may simultaneously act as any one of the one or more supply chain entities 150. For example, one or more supply chain entities 150 acting as a manufacturer can produce a product, and the same one or more supply chain entities 150 can act as a supplier to supply an item to itself or another one or more supply chain entities 150. Although one example of a supply chain network 100 is shown and described, embodiments contemplate any configuration of supply chain network 100, without departing from the scope described herein.

In one embodiment, image processing system 110 may be coupled with network 170 using communications link 180, which may be any wireline, wireless, or other link suitable to support data communications between image processing system 110 and network 170 during operation of supply chain network 100. One or more imaging devices 120 may be coupled with network 170 using communications link 182, which may be any wireline, wireless, or other link suitable to support data communications between one or more imaging devices 120 and network 170 during operation of supply chain network 100. Inventory system 130 may be coupled with network 170 using communications link 184, which may be any wireline, wireless, or other link suitable to support data communications between inventory system 130 and network 170 during operation of supply chain network 100. Transportation network 140 may be coupled with network 170 using communications link 186, which may be any wireline, wireless, or other link suitable to support data communications between transportation network 140 and network 170 during operation of supply chain network 100. One or more supply chain entities 150 may be coupled with network 170 using communications link 188, which may be any wireline, wireless, or other link suitable to support data communications between one or more supply chain entities 150 and network 170 during operation of supply chain network 100. Computer 160 may be coupled with network 170 using communications link 190, which may be any wireline, wireless, or other link suitable to support data communications between computer 160 and network 170 during operation of supply chain network 100.

Although communication links 180-190 are shown as generally coupling image processing system 110, one or more imaging devices 120, inventory system 130, transportation network 140, one or more supply chain entities 150, and computer 160 to network 170, any of image processing system 110, one or more imaging devices 120, inventory system 130, transportation network 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling image processing system 110, one or more imaging devices 120, inventory system 130, transportation network 140, one or more supply chain entities 150, and computer 160. For example, data may be maintained locally to, or externally of, image processing system 110, one or more imaging devices 120, inventory system 130, transportation network 140, one or more supply chain entities 150, and computer 160 and made available to one or more associated users of image processing system 110, one or more imaging devices 120, inventory system 130, transportation network 140, one or more supply chain entities 150, and computer 160 using network 170 or in any other appropriate manner. For example, data may be maintained in a cloud database at one or more locations external to image processing system 110, one or more imaging devices 120, inventory system 130, transportation network 140, one or more supply chain entities 150, and computer 160 and made available to one or more associated users of image processing system 110, one or more imaging devices 120, inventory system 130, transportation network 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, image processing system 110 may generate a grouping of similar images for the inventory of one or more supply chain entities 150 in supply chain network 100. Furthermore, image processing system 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities, and the configuration and quantity of packaging and shipping of items based on one or more groupings of images and/or current inventory or production levels. For example, the methods described herein may include computers 160 receiving product data 210 (FIG. 2) from automated machinery having at least one sensor and product data 210 corresponding to an item detected by the automated machinery. The received product data 210 may include an image of the item, an identifier, as described above, and/or other product information associated with the item (dimensions, texture, estimated weight, and the like). The method may further include computers 160 looking up the received product data 210 in a database system associated with image processing system 110 to identify the item corresponding to the product data 210 received from the automated machinery.

Computers 170 may also receive, from one or more sensors 126 of the one or more imaging devices, a current location of the identified item. Based on the identification of the item, computers 160 may also identify (or alternatively generate) a first mapping in the database system, where the first mapping is associated with the current location of the identified item. Computers 160 may also identify a second mapping in the database system, where the second mapping is associated with a past location of the identified item. Computers 160 may also compare the first mapping and the second mapping to determine if the current location of the identified item in the first mapping is different than the past location of the identified item in the second mapping. Computers 160 may then send instructions to the automated machinery based, as least in part, on one or more differences between the first mapping and the second mapping such as, for example, to locate items to add to or remove from an inventory of or package for one or more supply chain entities 150.

Figure 2:
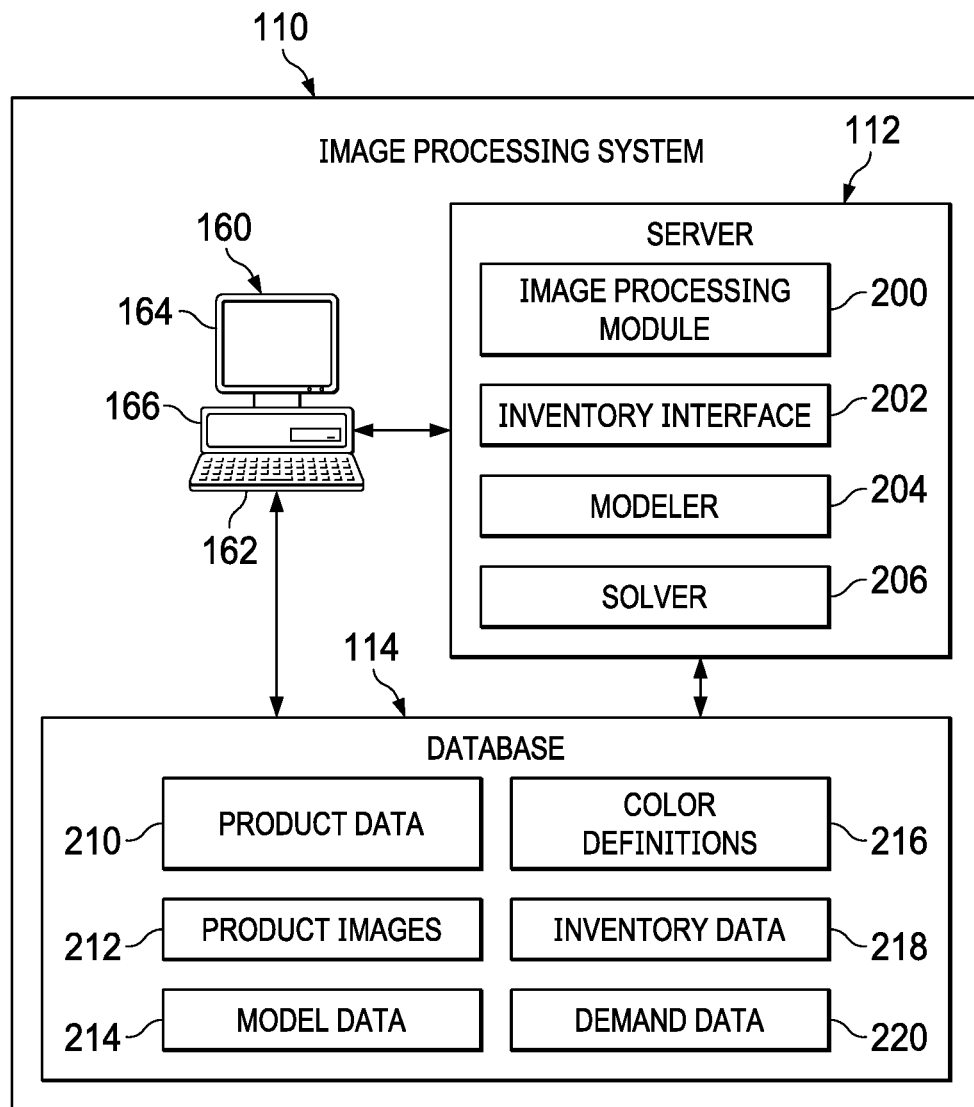
FIG. 2 illustrates the image processing system and the one or more imaging devices of FIG. 1 in greater detail, in accordance with an embodiment.

FIG. 2 illustrates image processing system 110 of FIG. 1 in greater detail, according to an embodiment. As discussed above, image processing system 110 may comprise server 112 and database 114. Although image processing system 110 is shown as comprising a single server 112 and a single database 114, embodiments contemplate any suitable number of servers or databases internal to or externally coupled with image processing system 110.

Server 112 of image processing system 110 may comprise image processing module 200, inventory interface 202, modeler 204, and solver 206. According to embodiments, image processing module 200 analyzes images based on a color-coding model, generates color labels for imaged products, assigns products to color groups, performs product image preprocessing, and extracts features from product images. According to embodiments, image processing system 110 performs feature extraction using a non-overlapping box encoder and an iterative cell encoder. According to further embodiments, image processing system 110 may run a clustering algorithm, such as a k-means clustering, over raw image pixel data. However, as the feature space may be too high-dimensional, the results may not be optimal. According to some embodiments, the functions and methods described in connection with image processing module 200 or image processing system 110 may be performed by an image processor comprising a purpose-built microchip that performs one or more of the functions described.

According to embodiments, inventory interface module 202 provides a user interface to receive, store, modify, and transmit product data 210, including images of products, existing color codes, pricing data, attribute data, inventory levels, and other like data about one or more products at one or more locations in system 100 including one or more databases associated with image processing system 110, inventory system 130, transportation network 140, and/or one or more supply chain entities 150.

According to an embodiment, modeler 204 defines color-coding models based, at least in part, on a neural network model architecture, such as a Restricted Boltzmann Machine (RBM) or auto-encoder model. According to embodiments, image processing system 110 receives product images or image data as a feature vector and generates an output layer composed of n binary random variables, which control the maximum number of output color groups. Embodiments of modeler 204 contemplate generating models with hidden layers, represented by binary or real random variables, or extending a color-coding model to include auto-encoders and adversarial networks, as explained in more detail below. According to some embodiments, solver 206 comprises one or more modules that, in response to receiving input data, generates a color grouping, as described in more detail below.

Figure 3:
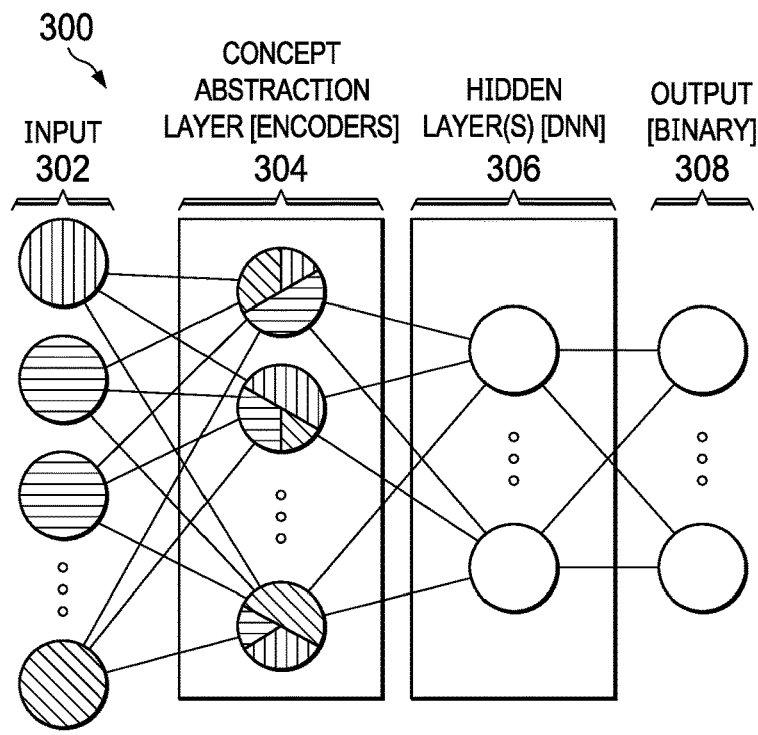
FIG. 3 illustrates a diagram of an exemplary color-coding model, according to an embodiment.

FIG. 3 illustrates a diagram 300 of an exemplary color-coding model, according to embodiments. In one embodiment, the color-coding model of image processing system 110 is an unsupervised generative neural network model, such as, for example, the Restricted Boltzmann Machine ("RBM") or auto-encoder model, comprising an input layer 302, a concept abstraction layer 304, one or more hidden layers 306, and an output layer 308. Although the color-coding model is described here in connection with a RBM, embodiments contemplate any other suitable model, such as, for example, auto-encoders and/or adversarial networks.

Input layer 302 of the color-coding model comprises a feature vector, v. This vector may be generated from one or more preprocessed product images, as explained in more detail below. Concept abstraction layer 304 comprises one or more encoders, such as the box encoder, the iterative cell encoder, or both. According to some embodiments, the feature vector v comprises the feature vectors $v_b$ and $v_c$, which are generated by the box and cell encoders, respectively. According to an embodiment, the input to the Deep Neural Network (DNN) is an abstraction of the pixel color densities as random variables and/or the input is an aggregation of color values from certain regions of the input image.

The deep neural network (DNN) layer comprises one or more hidden layers 306, represented by one or more hidden layer vectors, h. Multiple hidden layers 306 create depth in the architecture of the color-coding model. According to embodiments, the color-coding model comprises a first instance of the color-coding model for binary random variables and a second instance of the color-coding model for real random variables.

Output layer 308 of the color-coding model comprises n binary random variables, represented by $o=\{o\}_i^n$, which controls the maximum number of output color groups the model is expected to generate. In embodiments where the color-coding model is an auto-encoder or an adversarial network, the output variable, o, may also be modeled as a real vector, and the color-coding model comprises an extra clustering action to group learned features, such as, for example, grouping product images according to the similarity of product colors. For example, supposing that input layer 302 to the color-coding model comprises various product images of dresses in four colors: dark red, light red, light blue, and dark blue. According to this example, output layer 308 may comprise the product images sorted into groups based on the dress color (i.e. one group of product images for each of the four dress colors). The color-coding model will organize the dresses according to color distribution similarities, where each color is based on a predetermined number of groupings based on the structure of the color-coding model. In this manner, the color-coding model learns to organize images in the fashion industry based on the color of the article of clothing in the image.

The color-coding model determines groupings of item colors in the context of deep convolutional neural networks. Deep convolutional neural networks are powerful for object detection and recognition. Instead of directly feeding the model raw image pixels as input data, the image processor constructs higher-level image features. The color-coding model learns groupings in an unsupervised fashion in order to reduce the bias that might have been induced by the sample images of products received by image processing system 110. For a given set of fashion product images (i.e. training data), the image processing model learns features so that the products are well grouped in the fashion color space. The group identifiers in that group then become the machine generated color label for each product belonging to the same group. When the image processing model is given a new, previously unseen product image, the model assigns that product image to its corresponding group, as explained in more detail below.

Although server 112 is shown and described as comprising a single image processing module 200, a single inventory interface 202, a single modeler 204, and a single solver 206, embodiments contemplate any suitable number or combination of these located at one or more locations, local to, or remote from image processing system 110, such as on multiple servers or computers at any location in supply chain network 100.

Database 114 of image processing system 110 may comprise one or more databases or other data storage arrangement at one or more locations, local to, or remote from, server 112. Database 114 comprises, for example, product data 210, product images 212, model data 214, color definitions 216, inventory data 218, and demand data 220. Although, database 114 is shown and described as comprising product data 210, product images 212, model data 214, color definitions 216, inventory data 218, and demand data 220, embodiments contemplate any suitable number or combination of these, located at one or more locations, local to, or remote from, image processing system 110 according to particular needs.

Product data 210 of database 114 may comprise one or more data structures for identifying, classifying, and storing data associated with products, including, for example, a product identifier (such as a Stock Keeping Unit (SKU), Universal Product Code (UPC) or the like), product attributes and attribute values, sourcing information, and the like. Product data 210 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

As an example only and not by way of limitation, a fashion retail product may comprise, for example, shirts, shoes, dresses, skirts, socks, purses, suits, or any other like clothing or accessory. Each product comprises product attributes that may include any suitable characteristic or product information, such as, item identifiers, size, colors, style, and/or the like. For example, an exemplary fashion retail product, such as a shirt, may comprise the attributes of gender, season, article of clothing, color, sleeve-length, price segment, pattern, and/or the like. Exemplary attribute values for these attributes may include, for example, male or female, for gender; spring, summer, fall, winter, for season; top, blouse, shirt, bottom, pants, shorts, skirt, or the like, for article of clothing; red, blue, green, or the like, for color; long, short, medium, or the like, for sleeve-length; good, better, best, for price segment; stripe, checked, plain, or the like, for pattern. Although particular products comprising particular attributes and attribute values are described herein, embodiments contemplate any supply chain or retail products being associated with any product attributes and attribute values, accordingly to particular needs.

According to embodiments, product image data 212 of database 114 comprises product images, which may include digital images, digital videos, or other like imaging data of one or more retail products. According to embodiments, product images may be raw data received from an imaging sensor or a standard format computer-readable image file. Color models, such as, for example, the Red Green Blue ("RGB") model and the Hue Saturation Value ("HSV") model, may be used to transform analog signals to digital signals and for storing digital images and videos. Color models comprise image pixels as basic elements and may include other abstractions of information. According to an embodiment, standard color models may provide how pixels of an image are represented digitally, how color images are configured by users, and how image files are stored in computers. Using the RGB color model, for example, each pixel in an image is identified by a value for the red channel ("R"), a value for the green channel ("G"), and a value for the blue channel ("B"). For example, a pixel that is pink would comprise specific numerical values for each of the channels (R, G, and B) that, when mixed, create a pink color. Alternatively, a pixel that is purple would comprise different values for each of the R, G, and B channels that, when mixed, create a purple color. According to embodiments, RGB data may be stored in a three-dimensional matrix where each cell represents a pixel and a pixel is a combination of the R, G, and B channel values.

Model data 214 of database 114 may comprise a color-coding model based on artificial neural networks. Embodiments of the color-coding model receive, instead of raw image pixels, higher-level image features, which are the input to the neural network that learns model parameters in an unsupervised fashion to group colors of products in a color space. The group identifiers of the color groups then become the machine-generated color label for each product belonging to the group. When the model is given a new, previously unseen product image, the model assigns that product image to its corresponding group based on the color of the product identified in the product image.

Color definitions 216 of database 114 may comprise a set of uniform color-codes generated from a color-coding model and one or more images of retail products. According to embodiments, image processing system 110 provides a more meaningful machine-validated color designation. For example, the output of image processing system 110 may comprise a unique set of uniform color codes for each fashion product or supply chain entity 150. This may include a uniform color-coding model that unifies color-attribute values and generates consistent color codes for different products, different departments, different supply chain entities 150, and the like so that one or more enterprises may use consistent color codes to simplify color-involved supply chain planning decisions. For example, the color "Cayman blue" may represent a particular narrow range of colors that is consistent across all supply chain entities using the color codes generated by image processing system 110. According to some embodiments, standardizing a color definition provides numerically defining the color and identifying groups of similar colors even if the colors are not exact matches. According to embodiments, image processing system 110 numerically measures the similarity or dissimilarity between colors, such as, for example, 'red' and 'green.' The similarity or dissimilarity may then be used to define new colors, such as light-red' or 'dark-green' and improve performance of attribute-driven algorithms, such as attribute-based forecasting or segmentation.

Inventory data 218 of database 114 may comprise any data relating to current or projected inventory quantities or states. For example, inventory data 218 may comprise the current level of inventory for items at one or more stocking points across supply chain network 100. In addition, inventory data 218 may comprise order rules that describe one or more rules or limits on setting an inventory policy, including, but not limited to, a minimum order quantity, a maximum order quantity, a discount, a step-size order quantity, and batch quantity rules. According to some embodiments, image processing system 110 accesses and stores inventory data 218 in database 114, which may be used by image processing system 110 to place orders, set inventory levels at one or more stocking points, initiate manufacturing of one or more components, or the like. In addition, or as an alternative, inventory data 218 may be updated by receiving current item quantities, mappings, or locations from one or more imaging devices 120, inventory system 130, and/or transportation system 140.

Demand data 220 of database 114 may comprise, for example, any data relating to past sales, past demand, and purchase data of one or more supply chain entities 150. Demand data 220 may be stored at time intervals such as, for example, by the minute, hour, daily, weekly, monthly, quarterly, yearly, or any suitable time interval, including substantially in real time. According to embodiments, demand data 220 may include historical demand or projected demand forecasts for one or more retail locations or regions of one or more supply chain entities 150 and may include product attribute demand or forecasts. For example, a New York store may need 120 large black shirts and 65 medium striped black shirts while a Los Angeles store may need 34 medium yellow sweaters and 25 medium striped black shirts. Although a particular example of demand data 220 is described, embodiments contemplate any number or any type of demand data, according to particular needs.

As described more fully below and according to embodiments, image processing system 110 identifies product colors, groups similarly-colored products, and generates a uniform color-coding scheme for the one or more supply chain entities 150.

Figure 4:
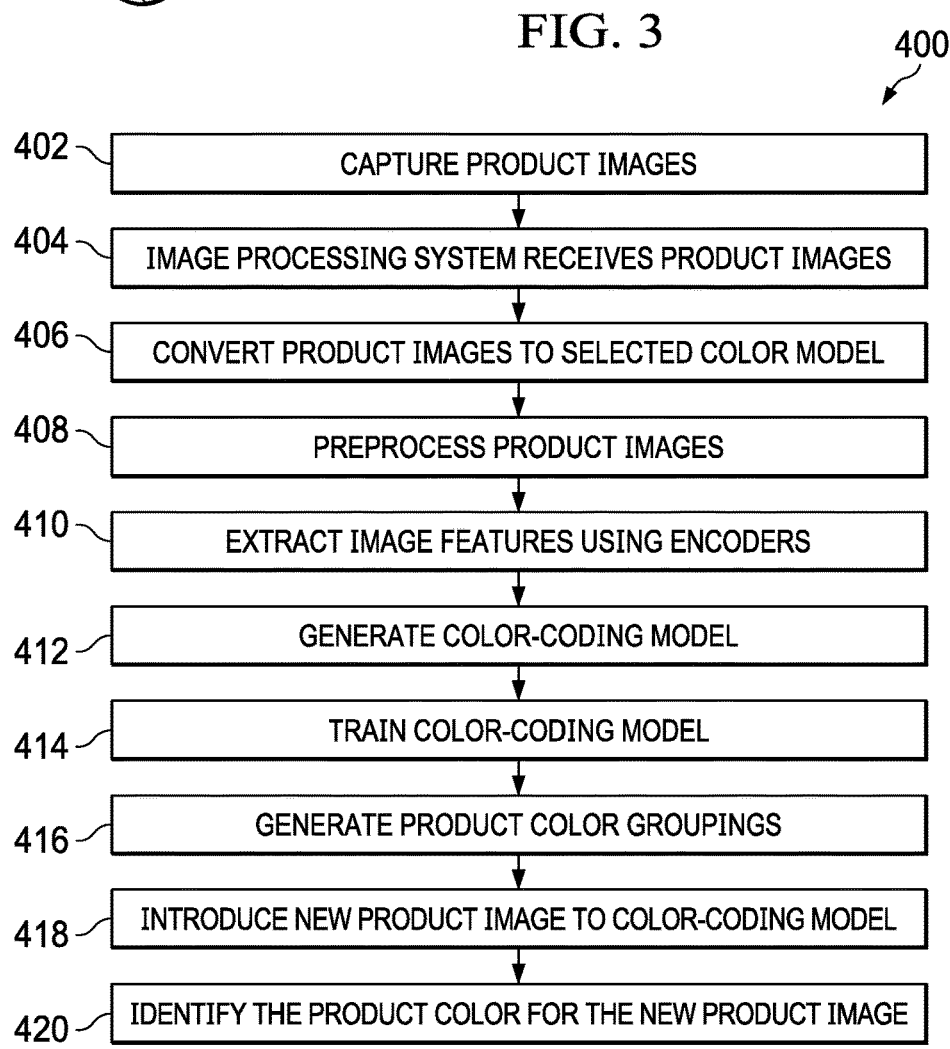
FIG. 4 illustrates an exemplary method of generating uniform color codes for fashion retail items, according to an embodiment.

FIG. 4 illustrates exemplary method 400 of generating uniform color codes for fashion retail items, according to an embodiment. Although the actions of method 400 are described in a particular order, one or more actions may be performed in one or more combinations or permutations according to particular needs.

At action 402, one or more imaging devices 120 capture one or more product images. According to embodiments, sensors 126 of one or more imaging devices 120 capture imaging data of one or more products and store the imaging data in one or more storage locations in supply chain network 100.

At action 404, image processing system 110 receives one or more product images. According to embodiments, image processing system 110 may access one or more product images from one or more data storage locations in supply chain network 100. As discussed in more detail below, color-coding model may first generate color groupings in response to a group of product images representing training images. After color-coding model is trained with the first group of product images and color groupings are identified, color-coding model may identify a color of a product in subsequently analyzed product images by selecting a color from the color groupings generated during training.

At action 406, image processing system 110 converts product images from analog to digital using some digital color representation model. Specific color representation models may comprise, for example, RGB, HSV, Luma and Color Difference ("YUV"), and Cyan, Magenta, Yellow, and Key ("CMYK"). According to embodiments, retailers or manufacturers configure, store, and display digital images based on one or more standard color models. These color models may also be used in connection with converting one digital format to another. Although particular color models have been shown and described, embodiments contemplate any suitable color model or models, according to particular needs. Although most images of retail fashion products comprise colored images, embodiments contemplate grayscale images, according to particular needs.

At action 408, image processing system 110 performs preprocessing actions on the input images. Prior to input to the color-coding model, product images may be preprocessed to, for example, remove sensor noise and align data.

Figures 5, 5A:
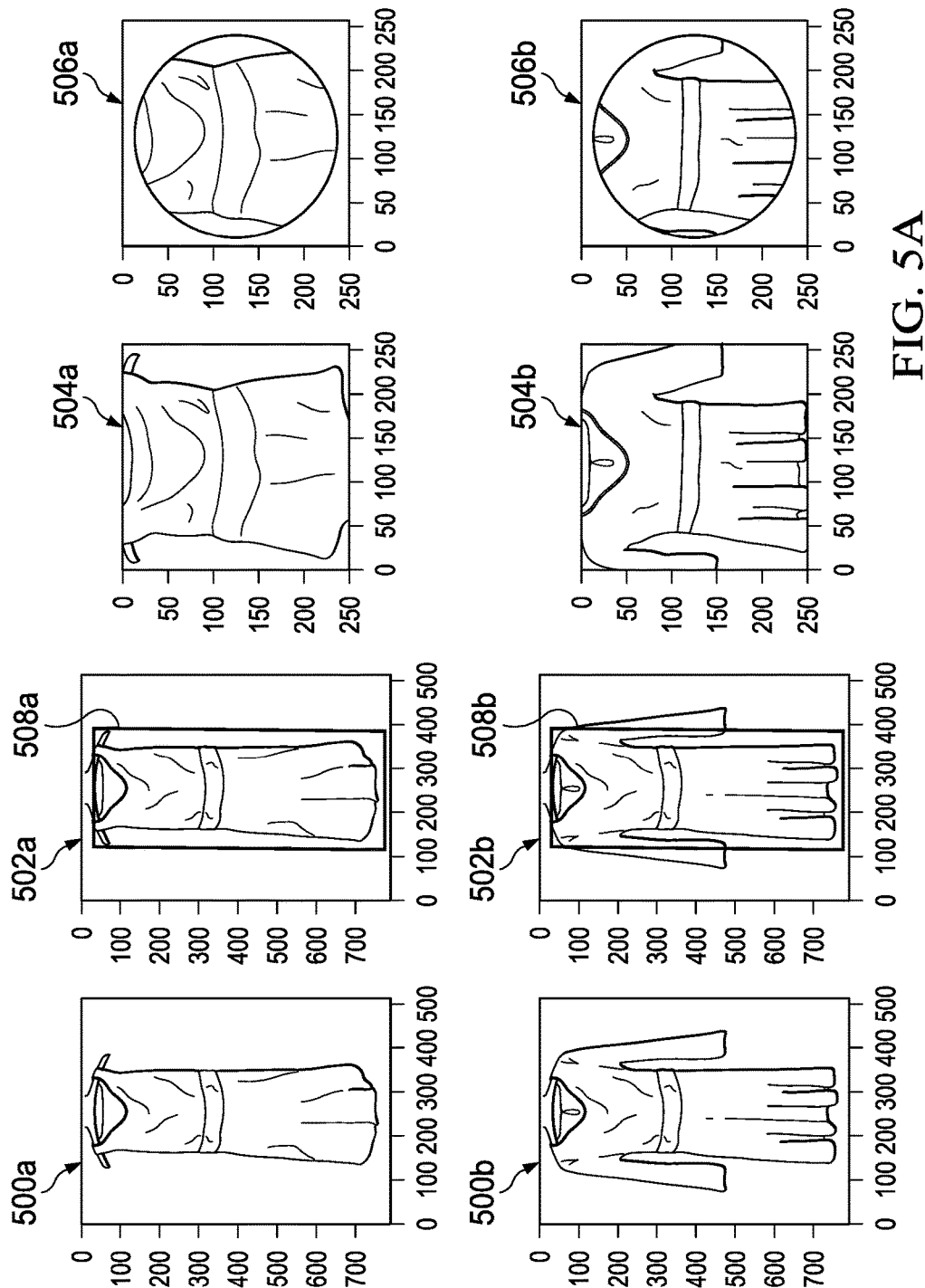
FIG. 5 (depicted as FIGS. 5A and 5B) illustrates the preprocessing of three exemplary retail product images, according to an embodiment.
Figure 5B:
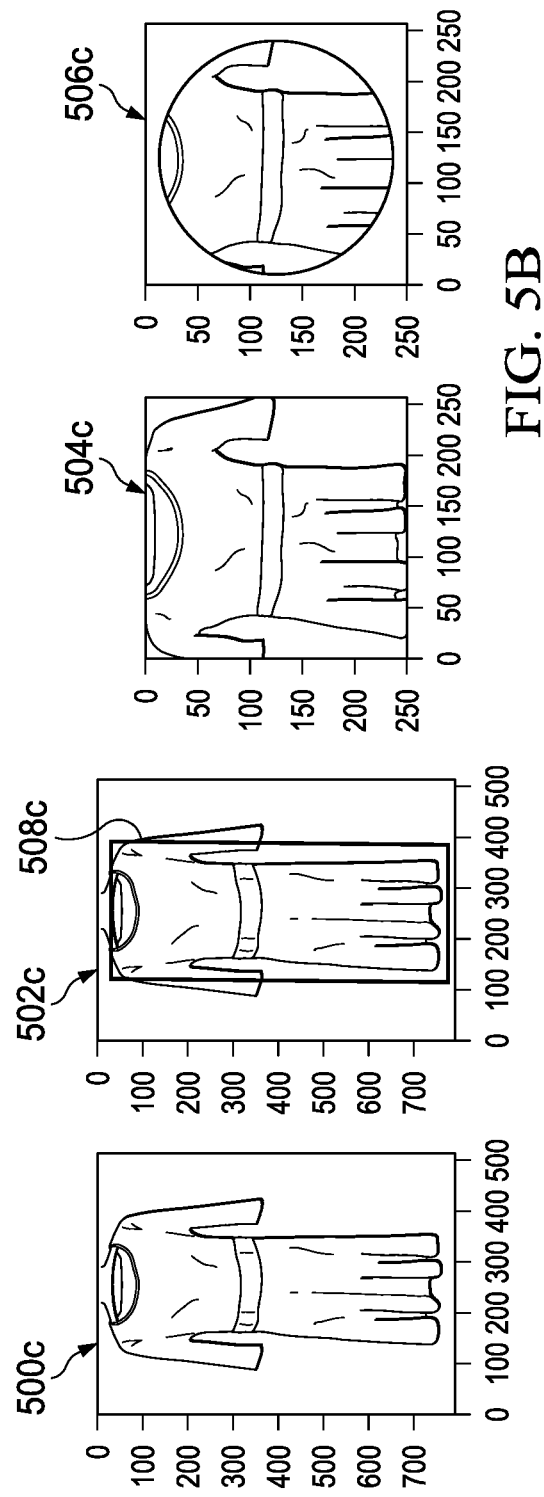

FIG. 5 (depicted as FIGS. 5A and 5B) illustrates the prepossessing of three exemplary retail product images 500a-500c, according to an embodiment. Exemplary retail product images 500a-500c comprise a multi-colored patterned dress product image 500a, a red solid-colored dress product image 500b, and a blue patterned product image 500c. According to embodiment, product images, such as, for example, exemplary retail product images 500a-500c, may be unsuitable for immediate processing by the color-coding model because of inconsistencies between product images including: the images are different sizes, the products are not in the same relative positions within the images, the background colors are different, and the like. By preprocessing product images, image processing module 200 may attenuate these problems and align the data so that the input is cleaned before being processed by the color-coding model. Image preprocessing may comprise one or more actions, including, bounding box annotation 502a-502c, image size unification 504a-504c, and circle masking 506a-506c.

According to embodiments, preprocessing product images comprises bounding box annotation 502a-502c that localizes a product in an image by a bounding box detection algorithm. Bounding box detection algorithm detects a product location within an image and generates a bounding box 508a-508c surrounding all or a major part of the product. Bounding box 508a-508c defines an area outside the bounding box 508a-508c that will be cropped and discarded from the raw product image. The area inside of bounding box 508a-508c defines the portion of the product image that is retained.

Preprocessing product images may also include image size unification 504a-504c which resizes the product images to a uniform size. For example, the new size may be represented by [h, w], where h is the new height, and w is the new width of the resized image. By example and not by way of limitation, the uniform size may be a standard transformation, such as a 250 pixel by 250 pixel square, or any other suitable image size. In addition, or as an alternative, preprocessing product images may comprise circle masking 506a-506c. According to embodiments, circle masking 506a-506c comprises passing the resized image through a circle masking step, where all pixels that are outside the periphery of a circle, whose center covers a major part of the item, are made equivalent. The pixels may be made equivalent by, for example, setting all pixels to white or black, or discarding the pixels and removing them from the product image. Although a circular mask is illustrated, any suitable mask shape may be used, including omitting the application of a mask altogether. According to embodiments, preprocessing one or more product images results in an RGB image that is represented as a three-dimensional matrix, [h, w, 3], where the third dimension represents the three RGB color channels: {R, G, B}.

At action 410, image processing system 110 extracts features using one or more encoders. After preprocessing product images, image processing system 110 may extract higher-level features from product image pixels (stored as matrix, [h, w, 3]) using one or more encoders, such as, for example, a non-overlapping box encoder and an iterative cell encoder.

Figure 6:
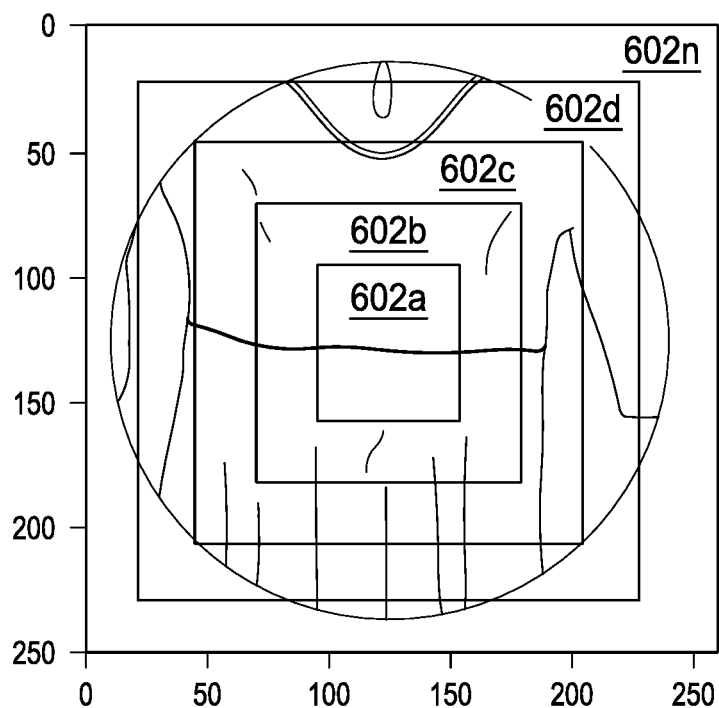
FIG. 6 illustrates extracting image features from an exemplary image using a non-overlapping box encoder, according to an embodiment.

FIG. 6 illustrates extracting image features from exemplary image 506b using a non-overlapping box encoder, according to an embodiment. Exemplary circle-masked red-dress product image 506b comprises the image resulting from the preprocessing of red solid-colored dress product image 500b. According to embodiments, the box encoder extracts a histogram of color distributions from non-overlapping boxes 602a-602n that extend from the center of image 506b and grow larger to the perimeter of image 506b. Concatenation of these box features define a feature vector, $v_b$; $|v_b|=n_b$, where, $n_b$ is the length of the feature vector $v_b$.

By way of further illustration, an example is now given. In the following example, image processing system 110 may extract color distribution information from each box in a non-overlapping analysis. In the above illustration, the dress color distribution is extracted from the center box 602a of image 506b, a separate color distribution is extracted from the next box 602b, another separate color distribution is extracted from the next box 602c, and so on. In other words, the second box 602b illustrated in the box encoder would not include color information from the first box 602 illustrated in the box encoder, and so on. The color information from the outer boxes 602d-602n may have less contributing information due to overlapping background noise effects, which has been normalized through the preprocessing actions.

According to embodiments, a box encoder may identify a representative or dominant color from a product image. By example and not by way of limitation, a box encoder may identify the dominant color from two exemplary product images of clothing, such as, for example, a first image comprising a blue dress that is a solid color and almost nearly fills the product image, and a second image comprising a solid blue jacket unbuttoned with a white blouse occupying the center of the image and black pants occupying the bottom portion of the image. Although the image of the solid-color dress would be represented by more blue pixels than the image of the blue jacket (where a significant portion of the image is occupied by a white blouse and black pants) the box encoder may still identify the dominant color of both images as blue. Because the image processing module 200 is using an RGB color model, white pixels are equivalent to an equal mixing of the three color channels with high values, and black pixels are equivalent to an equal mixing of the three color channels but with very lows values. In other words, the green and red channels will still be equally distributed because black and white pixels do not alter the proportion of the colors in the image. Because there are still more blue values than red or green values in both the first and second image, the box encoder will identify blue as the dominant color.

Figure 7:
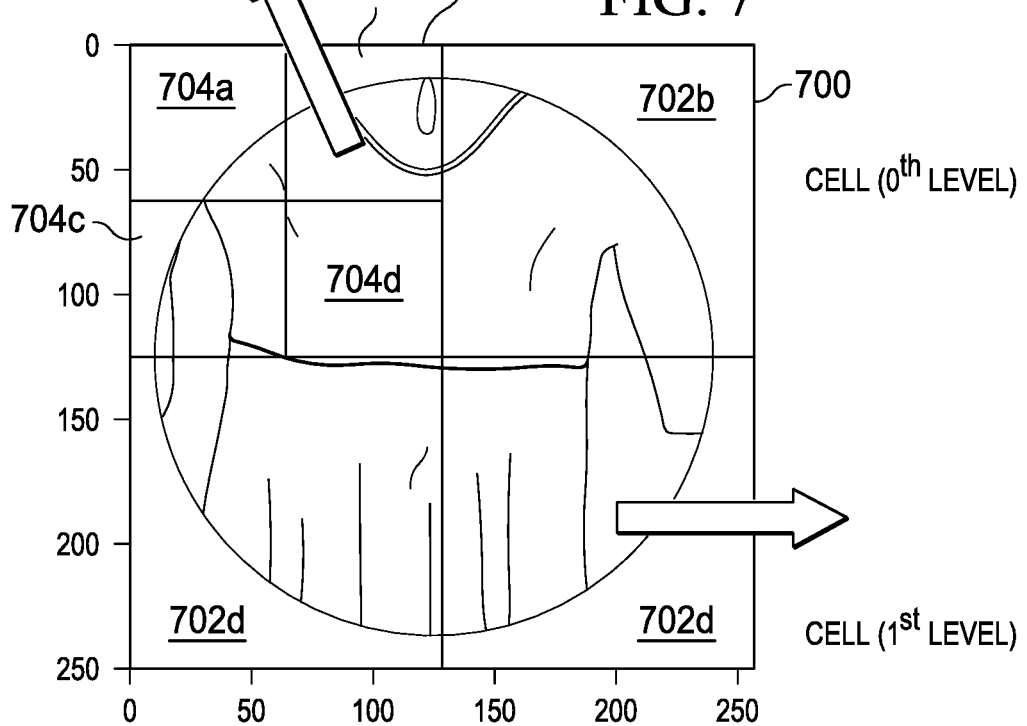
FIG. 7 illustrates extracting features from an exemplary image using the iterative cell encoder, according to an embodiment.

FIG. 7 illustrates extracting features from exemplary image 506b using the iterative cell encoder, according to an embodiment. Iterative cell encoder comprises an encoder that extract features from image 406b by dividing the sample image into an increasing number of cells. At each iteration-level, the image, or parts of the image, is divided into four equally-sized cells, which defines a cell at that level. For example, the full image itself defines the $0^{th}$ level cell 700. Dividing the sample image into four equally size cells generates four $1^{st}$ level cells 702a-702b. Dividing each of the $1^{st}$ level cells into four equally sized cells generates sixteen $2^{nd}$ level cells. However, for clarity, only up to the four $2^{nd}$ level cells 704a-704d generated from dividing $1^{st}$ level cell 702a are illustrated. From each iterative cell in various levels, histograms are extracted and concatenation of these features define the feature vector, $v_c$; $|v_c|=n_c$. For notational convenience, the box-encoder feature, $v_b$ and iterative cell encoder feature $v_c$ are defined together with a single random variable, v, which is named as the input or visible layer of the color-coding model, as explained below.

At action 412, image processing system 110 generates color-coding model. According to embodiments, the color-coding model may comprise three types of layers: a visible layer (v), a hidden layer (h), and an output layer (o). The visible layer of the color-coding model may be composed of feature vectors coming from the box and cell encoders, i.e. v=[$v_b$, $v_c$]. The output layer of the color coding model may comprise a vector of n binary random variables that sets the maximum number of possible output clusters. Between the visible layer, v, and the output layer, o, the color-coding model consists of zero, one, or more hidden layers, h. Each hidden layer may comprise one or more binary or floating point random variable nodes depending on the particular configuration of the color-coding model.

According to an embodiment, the joint probability distribution, P, of the color-coding model is determined according to Equation 1:

$$P(v, h, o) = \frac{1}{Z}\exp(-E(v, h, o)) \quad (1)$$

for visible variable v, hidden variable, h, output variable o, normalization constant or partition function, Z, and energy function, E(v, h, o).

For simplicity, the color-coding model is first explained without reference to the hidden layer, and then explained again, below, with the hidden layer included.

With no hidden layer, the color-coding model is determined according to Equation 2:

$$P(v, o) = \frac{1}{Z}\exp(-E(v, o)) \quad (2)$$

for visible variable v, output variable o, normalization constant or partition function, Z, and energy function, E(v, o). The energy function, in turn, is modeled according to Equation 3:

$$E(v, o) = \quad (3)$$
$$-\sum_{i,j} v_{b_i} W_{i,j} o_j - \sum_{i,j} v_{c_i} W_{i,j} o_j - \sum_j b_j o_j - \sum_i c_{b_i} v_{b_i} - \sum_i c_{c_i} v_{c_i}$$

where, $b_j$ and $\{c_{b_i}, c_{c_i}\}$ are the corresponding biases of the output and input (visible) units; $c_{b_i}$ is for the box encoder feature vector; and $c_{c_i}$ is for the iterative cell-encoder feature vector.

The output variables are disjoint to one other, and the conditional distribution is modeled as a Bernoulli distribution, according to Equation 4:

$$P(o|v) = \prod_j P(o_j|v) \quad (4)$$

The conditional of the visible variable given the output is modeled as a Gaussian with a diagonal covariance, according to Equation 5:

$$P(v|o) = \prod_i P(v_i|o) \quad (5)$$

To extend the color-coding model with one or more hidden layers, connections are added linking layers together. For example, connections may be added linking the input (v) to a first hidden layer (h), linking a first hidden layer (h) and a second hidden layer (ĥ), and linking a second hidden layer (ĥ) and the output layer (o). Each of the connections may be defined by corresponding parameter matrices as $W_{v,h}$, $W_{h,ĥ}$, and $W_{ĥ,o}$. Model learning is described in more detail below, however, the corresponding conditionals for P(h|v), P(ĥ|h), P(h|ĥ), and P(o|ĥ), are expressed in terms similar to Equations 4 and 5, above, depending on their data-types.

11)

Additionally, for the two input feature vectors, $v_b$ and $v_c$, the color-coding model may learn separate hidden-layer sequences, and the final layer (output) will merge and/or combine information from these two sequences as a fully connected neural-network layer.

According to embodiments, the color-coding model may include mathematical convolutions with max-pooling. Some preprocessed image data may have bounding-box annotation noise, such as, for example, when the product is not in the center of a detected bounding box in an image, or when bounding box removes or cuts off a portion of the product image. To remove this noise, and thus to employ a more general feature representation, image processing system 110 extends the color-coding model with convolutions and max-pooling operations that are applied between layers of the color-coding model.

At action 414, image processing system 110 trains color-coding model with one or more training product images. For a given set of product images, V={$v_i$}$_i^N$, the objective of the color-coding model is to learn parameter y maximizing the data log-likelihood according to Equation 6:

$$\Theta^* = \underset{\Theta}{\mathrm{argmax}} \sum_i^N \log P(v_i) \quad (6)$$

where, $\Theta^*$ encodes all neural network parameters, such as, for example, parameters for input to hidden layers, parameters for hidden to hidden layer(s), and parameters for hidden to output layers. According to some embodiments, the color-coding model may use a Gibbs block sampling and layer-to-layer contrastive divergence ("CD") algorithm for parameter learning.

At action 416, image processing system 110 generates product color groupings. According to embodiments, the color-coding model may make a prediction for a test product image, $v_t$, where the output comprises the corresponding cluster label as assigned according to Equation 7:

$$\underset{o_t}{\operatorname{argmax}} P(o_t | v_t, \Theta^*) \tag{7}$$

Figure 8:
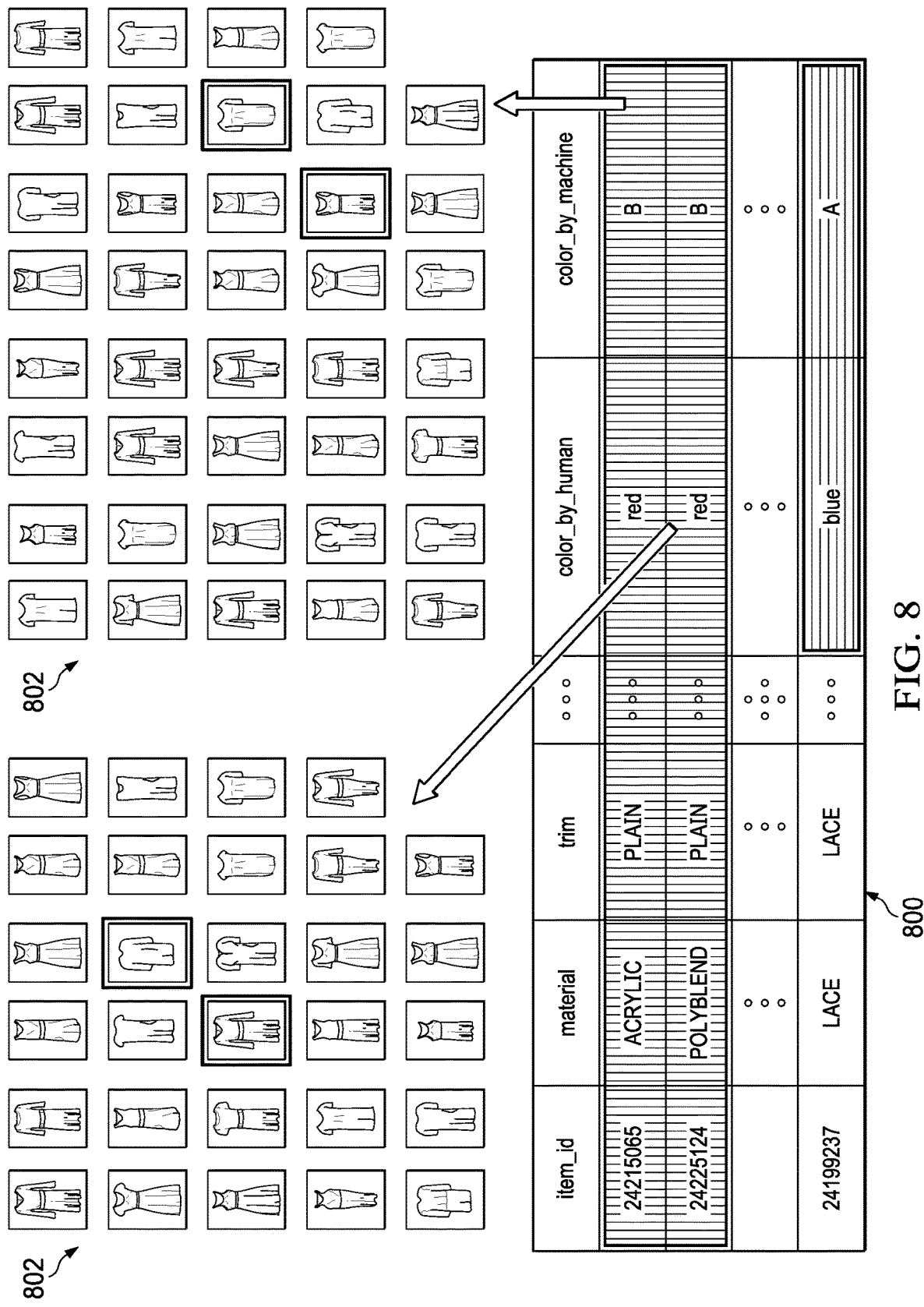
FIG. 8 illustrates an exemplary output of the color coding model compared with human expert's labels, according to an embodiment.

FIG. 8 illustrates an exemplary output of the color coding model, according to an embodiment. Output may comprise table 800 comprising color labels for retail items determined by human experts and by the color-coding model. For example, table 800 comprises columns and rows. Each column comprises a product attribute (such as an item identification number, material, trim, and color), and each row comprises product attribute values for a sample dataset 802 comprising product images of exemplary colored dresses. For example, table 800 comprises products 24215065, 24225124, and 24199237, each item listed on a different row. Table 800 also comprises the column "color_by_human," which identifies the color selected for an item by human experts, and the column "color_by_machine," which identifies the grouping selected by image processing module 110 using the color-coding model. Table 800 indicates that products 24215065 and 24225124 have been identified by human experts as sharing the same color, "red," while image processing module 200 also identified that these two products share the same color by grouping them into the same product image grouping, group "B."

According to embodiments, the output of the color coding model comprises a label for a group defined by its dominant color. Image processing system 110 may correlate the predefined color definitions to make them uniform across all retailers and manufacturers. According to some embodiments, the colors may be individually numericalized, which may provide metrics for exact matching.

At action 418, a new product image may be introduced to color-coding model. As discussed above, image processing system 110 may first train color-coding model to generate color groupings based on training product images. By training color-coding model, image processing system 110 may present new product images to the color-coding model, which attempts to identify into which color group the new product image should be placed.

At action 420, image processing module 200 may identify the product color for the new product image. Based on the color group identified by the color-coding model, image processing module 200 determines the color of the product in the new product image. According to embodiments, image processing module 200 may continue to identify the color of products in product images to group products according to uniform color codes. Once the images have been grouped, embodiments contemplate one or more supply chain planners using the organization to segment customers, identify trends, plan supply chain demands, plan product assortments, and the like. Additionally, embodiments contemplate the color-coding model of image processing system 110 may recognize that a certain color value which has never been seen before is the same as a different color value inputted at another time and it may leverage this information to save time. Further, image processing system 110 functions as an automatic data cleaning system, that organizes color attribute information based on actual image data or product attribute information. This improves the accuracy of any model or method based on color information in the downstream process.

Figure 9:
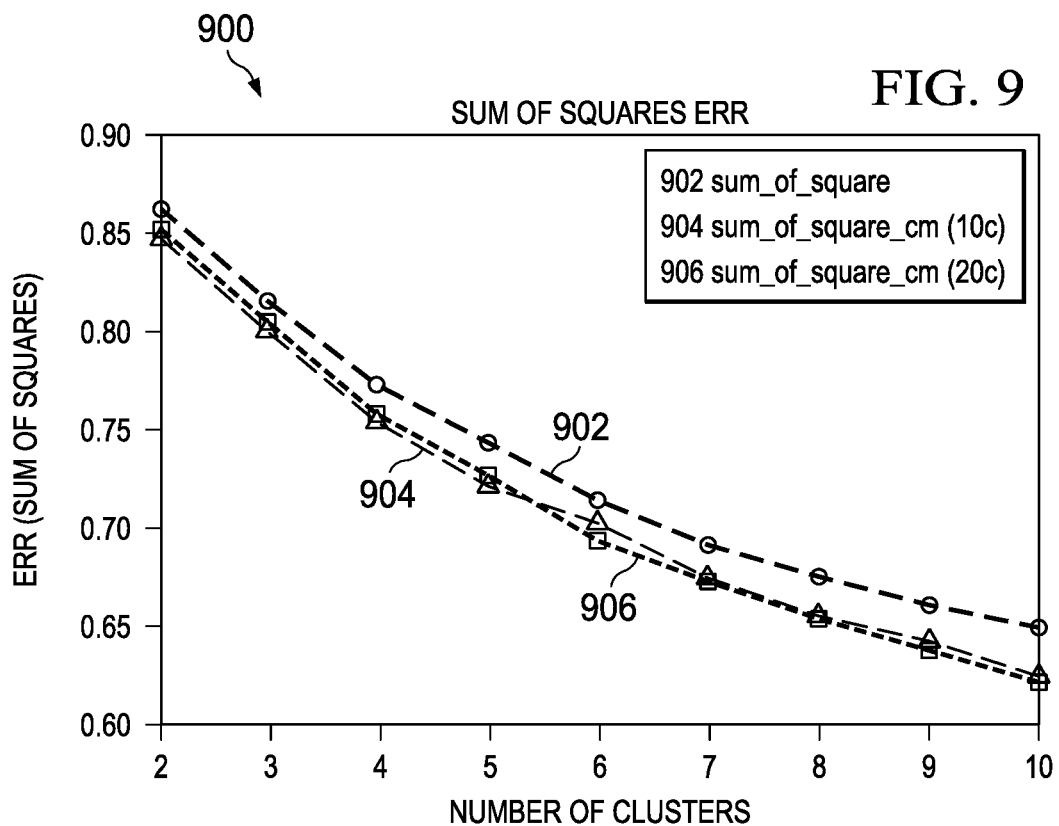
FIGS. 9 and 10 illustrate clustering results using the color-coding model, according to an embodiment.
Figure 10:
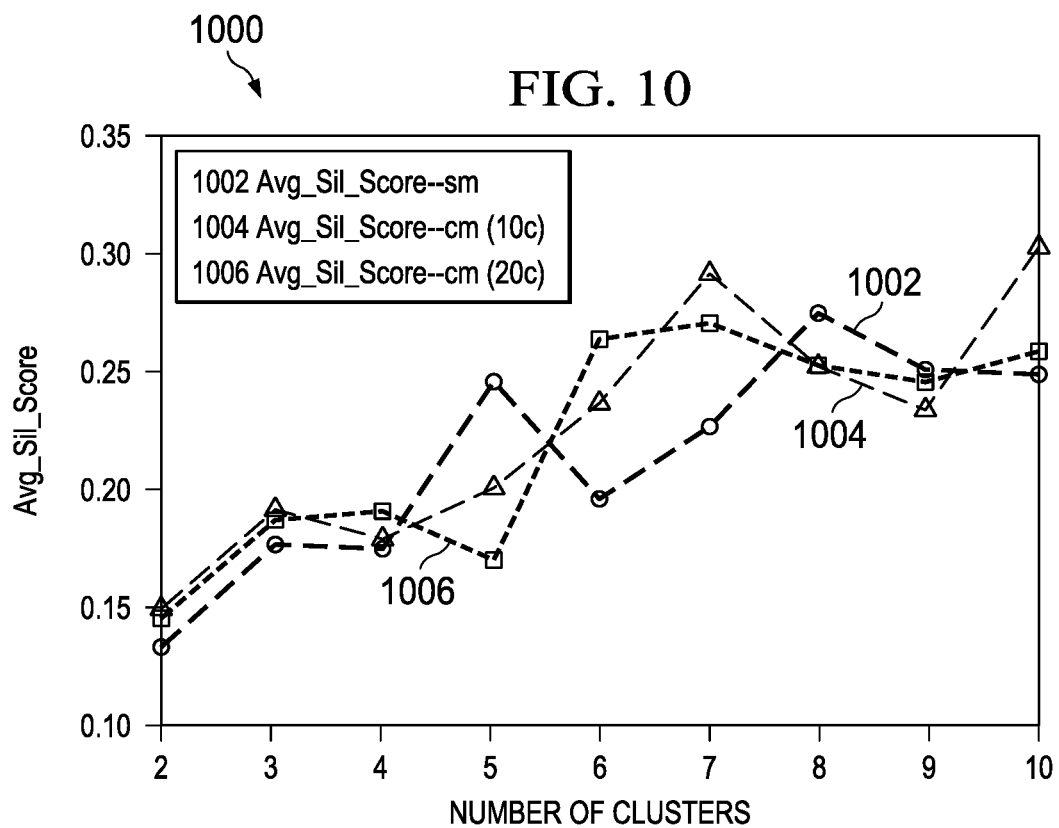

FIGS. 9 and 10 illustrate exemplary clustering results using color-coding model, according to an embodiment. Clustering results comprise sum of squares error 900 and average silhouette precision score 1000 for human-labeled 902 and 1002 and machine-generated color labels (ten machine-generated color groups 904 and 1004 and twenty machine-generated color groups 906 and 1006) using a sample dataset of exemplary colored dresses, a k-means clustering algorithm, and features extracted with a box encoder. Even with this naïve approach (without including any neural network training), the clustering results demonstrate a reasonable boost both for the error 900 and precision (silhouette score) 1000 matrices. Although examples have been described in connection with products in the fashion retail industry, embodiments contemplate the use of image processing system 110 for products in any suitable industry, according to particular needs.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
   a supply chain entity comprising an inventory having one or more items; and
   an image processing system comprising a server and configured to:
   receive an initial set of images of at least two items in the inventory;
   identify color distributions from the initial set of images using two encoders;
   group colors of the at least two items based on similarities of the identified color distributions using a color coding model;
   receive an image of at least one additional item;
   identify a color distribution from the image of the at least one additional item using the two encoders;
   assign a color to the at least one additional item based, at least in part, on the identified color distribution from the image of the least one additional item and the grouped colors of the at least two items; and
   modify a color attribute value associated with the at least one additional item based, at least in part, on the assigned color and a uniform color code.

2. The system of claim 1, wherein the image processing system preprocesses an image of an item by:
   localizing an item in an image by a bounding box detection algorithm;
   resizing the image to a uniform size; and
   applying an image mask.

3. The system of claim 1, wherein the two encoders comprise at least one of a box encoder and an iterative cell encoder.

4. The system of claim 1, wherein the image processing system is further configured to:
identify customer segments based, at least in part, on the modified color attribute value and purchase history of one or more customers of the supply chain entity.

5. A method, comprising:
receiving, by an image processing system comprising a server, an initial set of images of at least two items in an inventory of a supply chain entity;
identifying, by the image processing system, color distributions from the initial set of images using two encoders;
grouping, by the image processing system, colors of the at least two items based on similarities of the identified color distributions using a color coding model;
receiving, by the image processing system, an image of at least one additional item;
identifying, by the image processing system, a color distribution from the image of the at least one additional item using the two encoders;
assigning, by the image processing system, a color to the at least one additional item based, at least in part, on the identified color distribution from the image of the least one additional item and the grouped colors of the at least two items; and
modifying, by the image processing system, a color attribute value associated with the at least one additional item based, at least in part, on the assigned color and a uniform color code.

6. The method of claim 5, further comprising:
preprocessing an image of an item by:
localizing, by the image processing system, an item in an image by a bounding box detection algorithm;
resizing, by the image processing system, the image to a uniform size; and
applying, by the image processing system, an image mask.

7. The method of claim 5, wherein the two encoders comprise at least one of a box encoder and an iterative cell encoder.

8. The method of claim 5, further comprising:
identifying, by the image processing system, customer segments based, at least in part, on the modified color attribute value and purchase history of one or more customers of the supply chain entity.

9. The method of claim 7, wherein the box encoder extracts a histogram of color distributions from non-overlapping boxes that extend from the center of an image and grow larger to the perimeter of the image and concatenation of box features define a feature vector.

10. A non-tangible computer-readable medium embodied with software, the software when executed:
receives an initial set of images of at least two items in an inventory of a supply chain entity;
identifies color distributions from the initial set of images using two encoders;
groups colors of the at least two items based on similarities of the identified color distributions using a color coding model;
receives an image of at least one additional item;
identifies a color distribution from the image of the at least one additional item using the two encoders;
assigns a color to the at least one additional item based, at least in part, on the identified color distribution from the image of the least one additional item and the grouped colors of the at least two items; and
modifies a color attribute value associated with the at least one additional item based, at least in part, on the assigned color and a uniform color code.

11. The non-tangible computer-readable medium of claim 10, wherein the software when executed is configured to preprocess an image of an item by:
localizing an item in an image by a bounding box detection algorithm;
resizing the image to a uniform size; and
applying an image mask.

12. The non-tangible computer-readable medium of claim 10, wherein the two encoders comprise at least one of a box encoder and an iterative cell encoder.

13. The non-tangible computer-readable medium of claim 10, wherein the software when executed further:
identifies customer segments based, at least in part, on the modified color attribute value and purchase history of one or more customers of the supply chain entity.

14. The non-tangible computer-readable medium of claim 12, wherein the box encoder extracts a histogram of color distributions from non-overlapping boxes that extend from the center of an image and grow larger to the perimeter of the image and concatenation of box features define a feature vector.

* * * * *